Nov. 10, 1964  F. E. SWAIN  3,156,445
BUTTERFLY VALVES
Filed Sept. 29, 1960  2 Sheets-Sheet 1
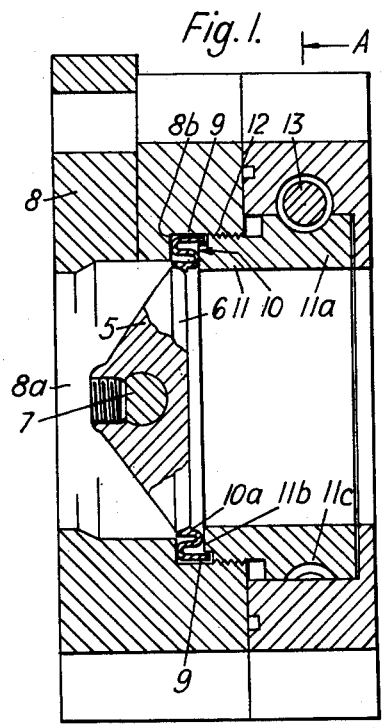
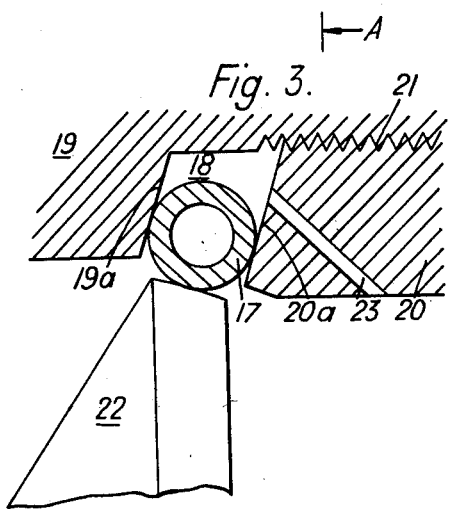
Inventor
FRANK EDWARD SWAIN
By Norris + Bateman
Attorneys Nov. 10, 1964     F. E. SWAIN     3,156,445
BUTTERFLY VALVES
Filed Sept. 29, 1960     2 Sheets-Sheet 2

Inventor
FRANK EDWARD SWAIN
By Norris & Bateman
Attorneys

United States Patent Office 3,156,445
Patented Nov. 10, 1964

3,156,445
BUTTERFLY VALVES
Frank Edward Swain, 9 Kirkstone Close, Glenfield Frith
Drive, Leicester, England
Filed Sept. 29, 1960, Ser. No. 59,406
3 Claims. (Cl. 251—171)

This invention relates to butterfly valves of a type comprising a valve body having therein a flow passage and an annular recess about this flow passage, a closure member pivotally mounted in the valve body with its axis of rotation extending across the longitudinal axis of said flow passage and offset in relation to said recess, a radially resilient ring mounted in said recess so as to be capable of radial movement to provide a resilient mouth which is an interference fit about a part of the periphery of the closure member to seal the flow passage.

The present invention has for its primary object to provide in a butterfly valve of the type specified, facility for accurately adjusting the interference fit of the closure member in the mouth of the ring initially to obtain the desired fit and thereafter to permit compensation of any wear occurring between the sealing surfaces of the ring and the closure member. Other objects which are achieved by the invention will appear from the description of various embodiments of the invention.

The invention consists of a butterfly valve of the type specified incorporating means for adjusting the natural diameter of the mouth of the ring to provide adjustment of the interference fit between the mouth of the ring and the closure member.

By reference to the natural diameter of the mouth of the ring we refer to the diameter of the inner periphery of the ring in its unstressed condition, that is to say when the ring is disengaged from the closure member.

Means for carrying the present invention into practice is described by way of example with reference to the accompanying drawings, wherein:

FIGURE 1 is a longitudinal section of a butterfly valve according to the invention.

FIGURE 3 illustrates on an enlarged scale a modification of the valve seen in FIGURES 1 and 2.

Figure 2:
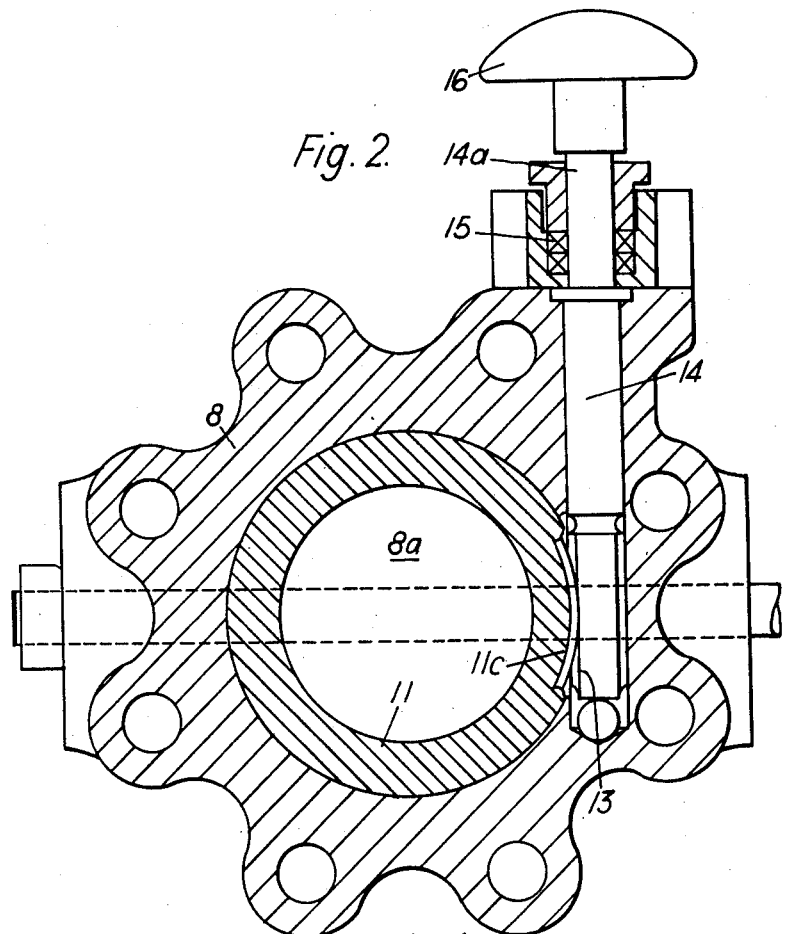
FIGURE 2 is a cross section on the line A—A of FIGURE 1.

In the embodiment of the invention illustrated in FIGURES 1 and 2 the butterfly valve comprises a closure member 5 furnished with a peripheral part 6 having the configuration of a segment of a sphere. The closure member 5 is secured to a shaft 7 rotatably mounted in bearings (not shown) in the valve body 8 so that the closure member can be rotated in the cylindrical flow passage or bore 8a of the valve body about an axis extending at right angles to the longitudinal axis of the flow passage.

The shaft 7 is offset in relation to an annular recess 9 in the internal wall of the valve body in the direction of the longitudinal axis of the valve body, and this recess accommodates a part of a seating ring generally designated 10 which is adapted for sealing engagement with the spherical peripheral part 6 of the closure member.

The seating ring 10 has an S-shaped cross section and is composed of a resilient elastic material so that the ring is able to expand or contract radially in the recess 9, it being understood that the relative dimensions of the ring and the recess, and more particularly those of the outer diameter of the ring and the diameter of the bottom of the recess, are such as to admit of any radial expansion. As seen more particularly in FIGURE 1 the recess 9 is defined between a shoulder face 8b in the valve body and the end face 11b of a generally cylindrical member 11, herein referred to as the compression member, which has a screw threaded mounting at 12 in the bore of the valve body whereby the compression member can be advanced along the longitudinal axis of the valve body so as to both support and compress the seating ring 10.

The diameter of the innermost limb 10a of the S-section of the ring is smaller than the diameter of the valve body adjacent to the recess so that the said limb 10a is able to advance in the bore of the valve body towards the closure member as the two bends of the ring section are compressed and thereby deformed in the recess in the valve body by the screw adjustment of the axial position of the compression member 11, it being noted that the mouth of the ring is also free for radial movement when engaged by the closure member.

In operation the compression member 11 is screw adjusted in the valve body so as to stress the ring whereby the mouth of the seating ring 10 is caused to take up a diameter which provides a slight interference fit with that of the closure member. When the closure member is rotated from an open position to a closed position in the flow passage the mouth of the seating ring is lightly engaged by the closure member so as to provide a fluid-tight fit between the ring and closure member. Also by this means any wear between the sealing surfaces of the ring and the closure member can be compensated and a very light loading between the sealing surfaces can be maintained as necessary to provide an effective seal.

Preferably the mouth of the ring is of frusto-conical form so as to provide line contact with the spherical peripheral part of the closure member to ensure an efficient seal.

Dependent on the duty of the valve the compression member 11 may consist of a simple screwed bush which can be adjusted in the bore of the valve body prior to the assembly of the valve in the fluid line, or alternatively and as shown in FIGURES 1 and 2, the compression member may be adapted for axial adjustment after assembly of the valve in the line. In the latter case the compression member 11 is provided with an extension piece 11a having a wormwheel cut at 11b in its periphery meshing with a worm 13 carried by a spindle 14 rotatably mounted in the valve body. The spindle 14 has an extension 14a projecting through a stuffing box 15 in the valve body and is furnished with a hand wheel 16 or the like for facilitating manual rotation of the spindle.

It will be seen that by manual rotation of the spindle 14 the compression member 11 is rotated and is thereby advanced in its screw mounting so as to effect axial movement of the compression member 11 to effect the required adjustment of the diameter of the seating ring mouth. Further it will be seen that reverse movement of the compression member 11 will allow expansion of the ring mouth and will permit elimination of rubbing loads between the ring and the closure member when the valve is opened.

In the modification of the valve seen in FIGURE 3 the seating ring takes the form of a hollow circular cross section annulus 17 of resilient diameter which may, according to the duty of the valve, contain gas under pressure.

As in the first embodiment the ring 17 is mounted in a recess 18 in the valve body 19 between a shoulder 19a in the body and the end face 20a of a compression member 20 located in the valve body whereby the ring is substantially free for radial movement in its recess when engaged by the closure member 22. Also as in the previously described embodiment the compression member 20 can be adjusted axially by virtue of its screw mounting at 21 in the valve body so as to compress the seating ring whereby the ring cross section is distorted to a required degree of ovality such that the mouth offered by the ring to the closure member is moved both axially and radially to adjust the effective diameter of the mouth of the ring.

It is to be noted that the ring 17 has only two lines of contact with the sides 19a, 20a of the recess 18 whereby any loss of heat from ring to valve body is restricted. This is a particularly desirable feature in high temperature applications of the valve since it assists the ring to maintain a temperature approximating that of the closure member so that the ring will grow in proportion to the closure member with increasing temperature and so maintain an effective seal.

The ring 17 can be mounted in a recess whose parallel sides extend at right angles to the longitudinal axis of the valve body as seen in FIGURE 1. Alternatively, as seen in FIGURE 3, the parallel sides 19a, 20a of the recess are frusto-conical with the apices of the hypothetical cones containing these sides located on the axis of the valve body in the vicinity of the pivotal axis of the closure member. By this means the ring 17 is maintained in a co-axial position with respect to the valve body.

It will be appreciated that the load between the mouth of the ring and the periphery of the closure member in the closed position of the valve can be made of low order and will be determined mainly by the tensile characteristics of the ring. If it is desired to make the load more independent of fluid pressure the space between the bottom of the recess 18 and the outer part of the ring 17 can be vented to the upstream side of the flow passage through a port 23 in the compression member 20 so that the thrusts acting on opposite sides of the ring are at least partially counterbalanced.

Figure 4:
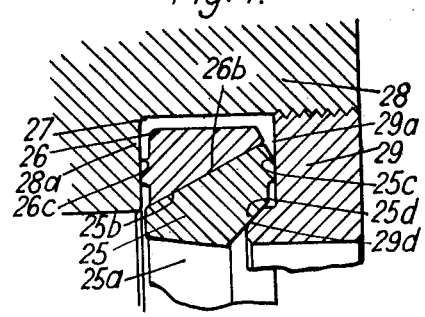
FIGURE 4 illustrates on an enlarged scale a further modification of the valve seen in FIGURES 1 and 2.

In the alternative embodiment of the invention disclosed in FIGURE 4 of the drawings the seating ring is of two-part construction which comprises a resilient inner ring 25 having a frusto-conical mouth 25a for sealing engagement with the spherically formed periphery of the closure member (not shown). The outer periphery of the inner ring 25 has a frusto-conical wedge face 25b whose inclination is opposite to that of the mouth 25a, and this wedge face 25b nests within a similarly inclined face 26b of a co-axial backing ring 26. The inner ring 25 and backing ring 26 are mounted for radial expansion in a recess 27 in the valve body 28 between a shoulder face 28a of the valve body and an end face 29a of a screw mounted compression member 29 in a similar manner to that described with reference to FIGURES 1, 2 and 3.

In operation it will be realised that by rotating and thereby advancing the compression member 29 to narrow the recess 27 the inner ring 25 will be forced into the backing ring 26 and by co-action of the wedge faces 25b and 26b the backing ring 26 will be stretched so as to allow an advance of the inner ring 25 towards the closure member. At the same time the inner ring 25 will suffer a radial compressive loading by the backing ring which will effect further advances of the inner ring and will diminish the natural diameter of the mouth of the inner ring.

To enable the backing ring 26 to expand radially in the case of relatively small diameter valves the backing ring may be split in the manner of a piston ring, whereas in larger valves the inherent elasticity of the developed length of the ring will provide the necessary resilience.

The end faces of the inner and backing rings which are respectively engaged with the face 29a of the compression member and with the face 28a of the valve body are formed with small area lands 25a and 26c for restricting the loss of heat from the ring assembly to the valve body.

To maintain the co-axial position of the ring assembly with respect to the valve body the compression member 29 may be furnished with a frusto-conical nose 29d co-acting with a similarly inclined conical face 25d of the inner ring. Alternatively the sides of the recess 27 may be conically inclined as described with reference to FIGURE 3. Also the recess 27 behind the ring may be vented to the upstream part of the flow passage for the purposes described in connection with FIGURE 3.

In a still further embodiment of the invention the seating ring 10 of FIGURE 1 is replaced by a hard rubber ring which can be internally stiffened by a metal ring embedded in the rubber. The ring is of trapezoidal cross section having three mutually perpendicular faces which are disposed within the recess 9 in the valve body and a frusto-conical mouth for engagement with the periphery of the closure member. In this embodiment it will be appreciated that as the compression member 11 is axially adjusted in the valve body so the axial thickness of the rubber ring will be compressed or allowed to expand against or with the elasticity of the ring whereby the mouth of the ring is caused to move axially relative to the closure member and the diameter of the mouth is contracted or is allowed to expand as required.

Although the illustrated embodiments of the invention employ a closure member whose axis of rotation is axially offset but parallel to the plane of the ring and its mounting recess in the valve body, it will be appreciated that alternatively the axis of rotation of the closure member can be angularly offset to the plane of the ring so that the bearings of the closure member lie one on each side of the seating ring.

Rings 10, 17, 25 and 26 as shown in the drawings are preferably metal.

I claim:

1. In a butterfly valve assembly, a valve body having a flow passage therethrough and an annular recess about said flow passage, a closure member pivotally mounted within said valve body on an axis of rotation extending across the longitudinal axis of said valve body, said closure member having a continuous peripheral surface radially inwardly of said recess when in valve closed position, means for selectively rotating said closure member between valve opened and closed positions to respectively permit and block flow of fluid through said body, an axially compressible radially ring disposed for radial movement in said recess with its outer periphery spaced from the surrounding bottom of said recess and its inner periphery providing a continuous resilient mouth engaged by said closure member in valve closed position, said ring being of such structure that axial compression of said ring causes a related change in the diameter of said mouth, axially adjustable means comprising a side wall of said recess axially engaging said ring for varying the axial compression of said ring to effect an infinite step adjustment of the diameter of said mouth between an interference fit with said closure member and a looser fit wherein rubbing loads applied by said ring to said closure member are reduced, and manually manipulatable means accessible externally of and extending through said valve body for axially displacing said wall to enable continuous adjustment of said diameter concomitantly with the rotataion of said closure member between opened and closed positions.

2. The butterfly valve defined in claim 1 wherein said means for selectively rotating said closure member comprises a shaft supporting said closure member for pivotal movement, and bearing means journalling said shaft and restraining said shaft and said closure member from movement axially of said flow passage.

3. The butterfly valve defined in claim 1 wherein said ring is formed with an S-shaped cross-section providing an innermost annular lip which defines said mouth and which is movable axially and radially in said flow passage by axial compression of the portion of said ring in said recess.

References Cited in the file of this patent

UNITED STATES PATENTS

| | | |
|---|---|---|
| 1,599,168 | Duncan | Sept. 7, 1926 |
| 2,892,609 | Bibbo | June 30, 1959 |
| 3,077,331 | Burtis | Feb. 12, 1963 |
| 3,077,332 | Burtis | Feb. 12, 1963 |

FOREIGN PATENTS

| | | |
|---|---|---|
| 753,860 | Great Britain | Aug. 1, 1956 |
| 962,562 | Germany | Apr. 25, 1957 |
| 1,216,051 | France | Nov. 23, 1959 |